Figure 1:
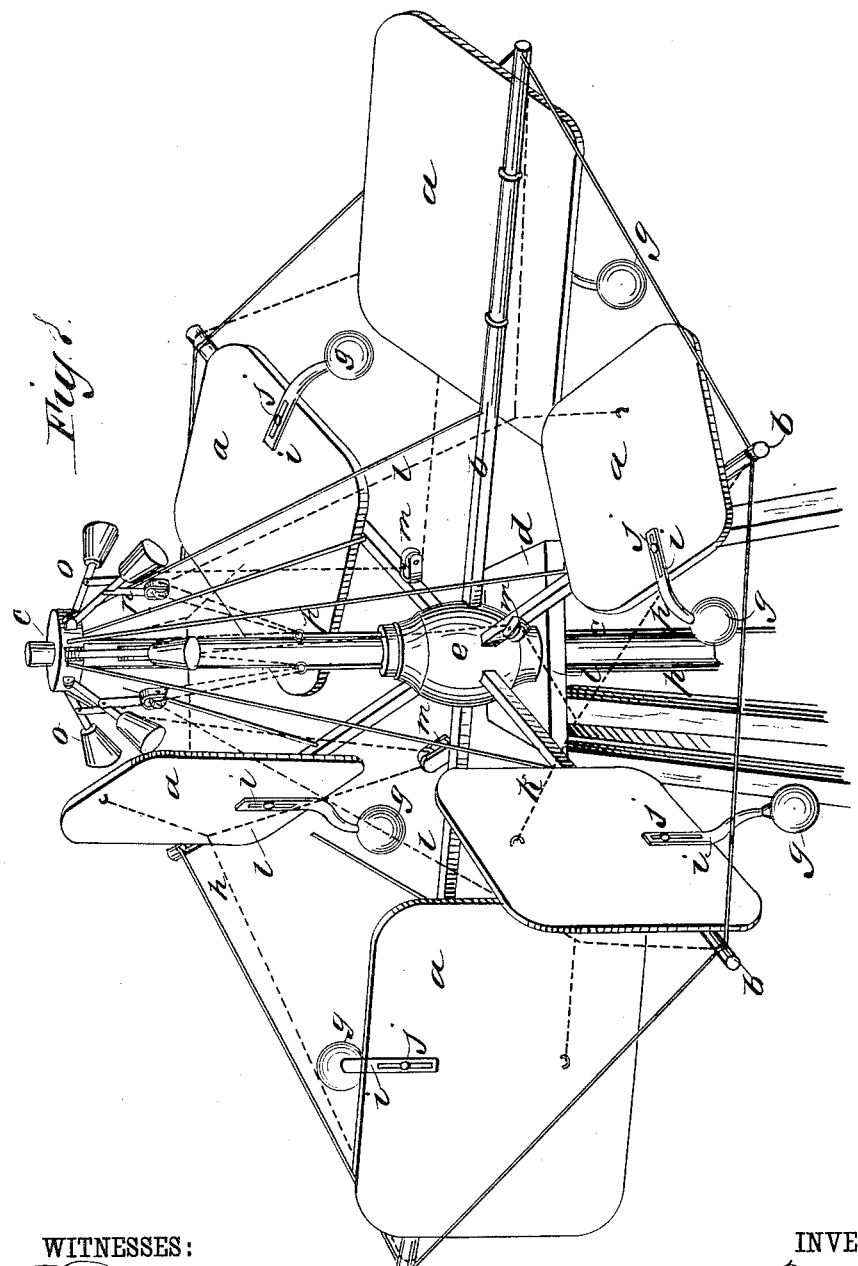

(No Model.)

2 Sheets—Sheet 1.

P. TEFFT.
WINDMILL.

No. 325,025. Patented Aug. 25, 1885.

WITNESSES:
Francis McArdle
C. Sedgwick

INVENTOR:
P. Tefft
BY Munn & Co
ATTORNEYS.

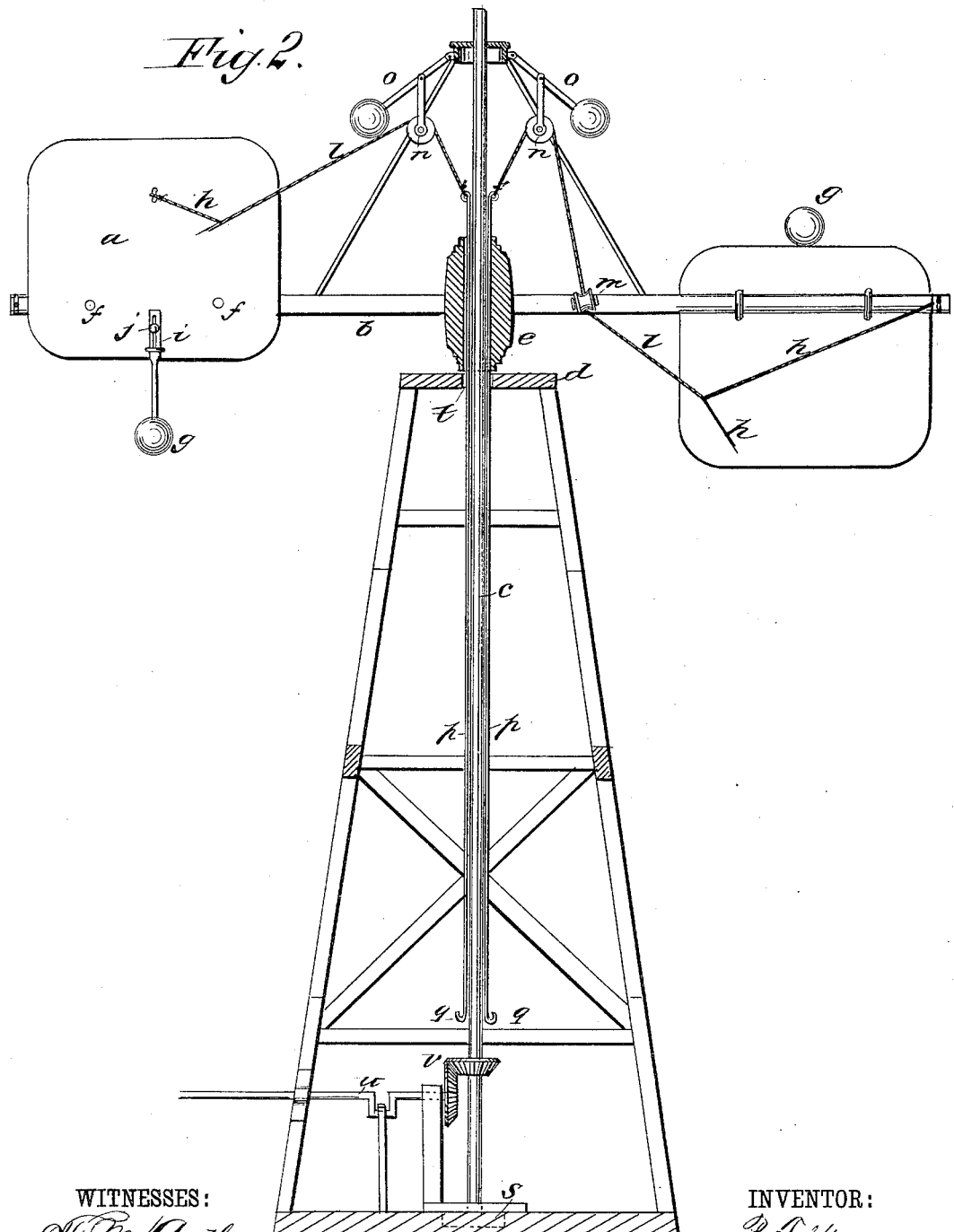

United States Patent Office.

PHA TEFFT, OF SAGUACHE, COLORADO.

WINDMILL.

SPECIFICATION forming part of Letters Patent No. 325,025, dated August 25, 1885.

Application filed March 5, 1884. Renewed December 23, 1884. (No model.)

*To all whom it may concern:*

Be it known that I, PHA TEFFT, of Saguache, in the county of Saguache and State of Colorado, have invented a new and Improved Windmill, of which the following is a full, clear, and exact description.

My invention consists of sails or vanes pivoted eccentrically to radial arms of a vertical shaft above or below the same, with means to balance them to take the wind, and stay-chains to hold them thereto and allowing them to swing down edgewise on the return side; also chains to hold them out of the wind when it is desired to stop the mill, which latter chains are also connected with governor-arms to regulate the force of the wind on the sails; and they are connected to rods extending down the shaft, to be manipulated from the ground to stop and start the mill, making a simple, cheap, efficient, and durable mill, all as hereinafter fully described.

Reference is to be had to the accompanying drawings, forming part of this specification, in which similar letters of reference indicate corresponding parts in both the figures.

Figure 1 is a perspective view of my improved windmill, and Fig. 2 is a sectional elevation.

The sails or vanes $a$, which may consist of plates of any kind, or canvas stretched in frames, are pivoted eccentrically of their longitudinal axes on the radial arms $b$ of a vertical shaft, $c$, set upon a suitable tower, $d$, and having a hub, $e$, to which said arms are attached. I prefer to have the sails arranged with the greater extension from the pivots $f$, alternately above and below the arms, so that they do not obstruct the wind upon each other, as if they all extended one way. These sails are balanced by weights $g$, so as to equalize the weight on the pivots to enable them to turn freely, said weights being attached by slotted arms $i$, capable of being shifted along the clamp-bolts $j$ to regulate the balance.

The sails are connected to the arms $b$ ahead by chains or cords $h$, which are adjusted to hold the sails vertically to the wind to receive the force of the same, but allowing them to turn down edgewise on the return side of the wheel by the effect of the wind on the sides of greatest extension of the sails from the arms when returning into the wind, and these chains are connected near the sails with other chains, $l$, which pass through guide-pulleys $m$, and thence up through pulleys $n$ of weighted centrifugal governor-arms $o$, and down to the rods $p$, extending along the shaft $c$, to a position near the ground, for use in holding the sails down flatwise when the wheel is to be stopped. Said rods have a hook, $q$, at the lower end, by which to fasten them to any suitable object when so holding the sails.

In a wheel having six sails I prefer to employ two of these rods, $p$, connecting three sails to each rod, so that one may secure the three sails of one side of the wheel when turned edgewise by the wind on the returning side, and the same with the sails of the other side by the other rod, which may be done, when in that condition, without having to pull the sails down against the wind.

The weighted centrifugal arms $o$ will, by rising with increasing speed of the wheel, turn the sails partially out of the wind, and thus regulate the speed.

If preferred, separate chains may connect the sails with the governor-arms, in which case the chains $l$ will not pass through the pulleys $n$ on the governor-arms, but will have any other suitable and proper guides.

The shaft $c$ has a step at $s$ in the base of the tower, and a bearing at $t$ in the top of the tower, and it will be geared near the lower end with a crank-shaft, $u$, by bevel-wheels $v$, or the power may be taken from it in any other approved way.

It will be seen that the above-described construction provides a simple and efficient wind-wheel well adapted for efficiency and durability, not requiring a tail or regulating-vane, and one that can be managed without difficulty and with but little force in stopping and starting it.

I am aware that the radial arms of a windmill-shaft have been provided with pivoted balanced sails that have ropes connecting them with the radial arms, and other ropes passing over suitable pulleys to the main shaft and thence to the base of the tower; and I do not claim such as of my invention.

Having thus described my invention, I claim as new and desire to secure by Letters Patent—

1. The combination, with radial arms of a vertical shaft, of sails $a$, eccentrically pivoted to said arms balanced thereon, connected by chains to the arms ahead to be held up to the wind, and also connected to weighted centrifugal governor-arms $o$, to be regulated thereby, substantially as described.

2. The combination, with radial arms of a vertical shaft, of sails $a$, pivoted eccentrically thereon, connected to the arms ahead for being held up to the wind, and connected to rods $p$, for holding them out of the wind, by chains $l$, also connecting them to the governor-arms, substantially as described.

PHA TEFFT.

Witnesses:
J. A. BERTSCHY,
CHAS. B. PHILLIPS.